(12) United States Patent
Guzman (10) Patent No.: US 10,532,464 B1
(45) Date of Patent: Jan. 14, 2020

(54) WALKING ROBOT

(71) Applicant: Luis Guzman, Suwanee, GA (US)

(72) Inventor: Luis Guzman, Suwanee, GA (US)

(*) Notice: Subject to any disclaimer, the term of this patent is extended or adjusted under 35 U.S.C. 154(b) by 261 days.

(21) Appl. No.: 15/641,391

(22) Filed: Jul. 5, 2017

(51) Int. Cl.
*B62D 57/032* (2006.01)
*B25J 11/00* (2006.01)
*B25J 19/00* (2006.01)
*B25J 19/02* (2006.01)

(52) U.S. Cl.
CPC ......... *B25J 11/0005* (2013.01); *B25J 19/005* (2013.01); *B25J 19/026* (2013.01); *B62D 57/032* (2013.01); *Y10S 901/01* (2013.01)

(58) Field of Classification Search
CPC .................................................... B62D 57/032
See application file for complete search history.

(56) References Cited

U.S. PATENT DOCUMENTS

| | | | |
|---|---|---|---|
| D292,110 S | 9/1987 | Tamakoshi | |
| 6,822,421 B2 * | 11/2004 | Ogawa | B25J 19/005 320/107 |
| 7,720,685 B2 * | 5/2010 | Sakagami | G06Q 99/00 382/118 |
| 7,885,727 B2 * | 2/2011 | Omote | H04W 24/00 700/245 |
| 8,020,649 B2 | 9/2011 | Ogawa | |
| 8,511,964 B2 | 8/2013 | Linn | |
| 9,359,028 B2 | 6/2016 | Jun | |
| 2002/0062178 A1 * | 5/2002 | Takahashi | B25J 19/005 700/245 |
| 2003/0009259 A1 | 1/2003 | Hattori | |
| 2005/0173164 A1 | 8/2005 | Maslov | |
| 2009/0321150 A1 * | 12/2009 | Kwon | B25J 5/00 180/8.6 |
| 2013/0158712 A1 | 6/2013 | Lee | |
| 2014/0039675 A1 | 2/2014 | Ead | |

FOREIGN PATENT DOCUMENTS

WO 2014174487 A2 10/2014

OTHER PUBLICATIONS https://www.youtube.com/watch?v=nFSXJ2PX9o (Year: 2012).*

* cited by examiner

*Primary Examiner* — Tony H Winner (57) ABSTRACT

The walking robot is a mobile robot. The walking robot moves in a bipedal manner. The bipedal movement of the walking robot is autonomous. The walking robot is a programmed device that: 1) can move in a bipedal fashion; 2) pick up and put down objects; 3) performs optical data processing functions such as avoiding objects during motion or identifying objects to pick up and put down; 4) performs speech recognition functions such as receiving spoken instruction; and, 5) responds to spoken instruction in an audible manner using a spoken language. The walking robot comprises a torso, a plurality of legs, a plurality of arms, and a helmet. The plurality of legs, the plurality of arms, and the helmet is attached to the torso. Both the plurality of legs and plurality of arms both rotate in the coronal plane, sagittal plane and the transverse plane.

15 Claims, 5 Drawing Sheets

WALKING ROBOT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of health and amusement, more specifically, a mechanically driven walking figure.

SUMMARY OF INVENTION

The walking robot is a mobile robot. The walking robot is configured to move in a bipedal manner. The bipedal movement of the walking robot is autonomous. The walking robot is a programmed device that: 1) can move in a bipedal fashion; 2) pick up and put down objects; 3) performs optical data processing functions such as avoiding objects during motion or identifying objects to pick up and put down; 4) performs speech recognition functions such as receiving spoken instruction; and, 5) responds to spoken instruction in an audible manner using a plurality of legs, a plurality of arms, and a helmet. The plurality of legs, the plurality of arms, and the helmet is attached to the torso. The walking robot is controlled using a microcontroller operated with the Linux operating system. Both the plurality of legs and plurality of arms both rotate in the coronal plane, sagittal plane and the transverse plane.

These together with additional objects, features and advantages of the walking robot will be readily apparent to those of ordinary skill in the art upon reading the following detailed description of the presently preferred, but nonetheless illustrative, embodiments when taken in conjunction with the accompanying drawings.

In this respect, before explaining the current embodiments of the walking robot in detail, it is to be understood that the walking robot is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the walking robot.

It is therefore important that the claims be regarded as including such equivalent construction insofar as they do not depart from the spirit and scope of the walking robot. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
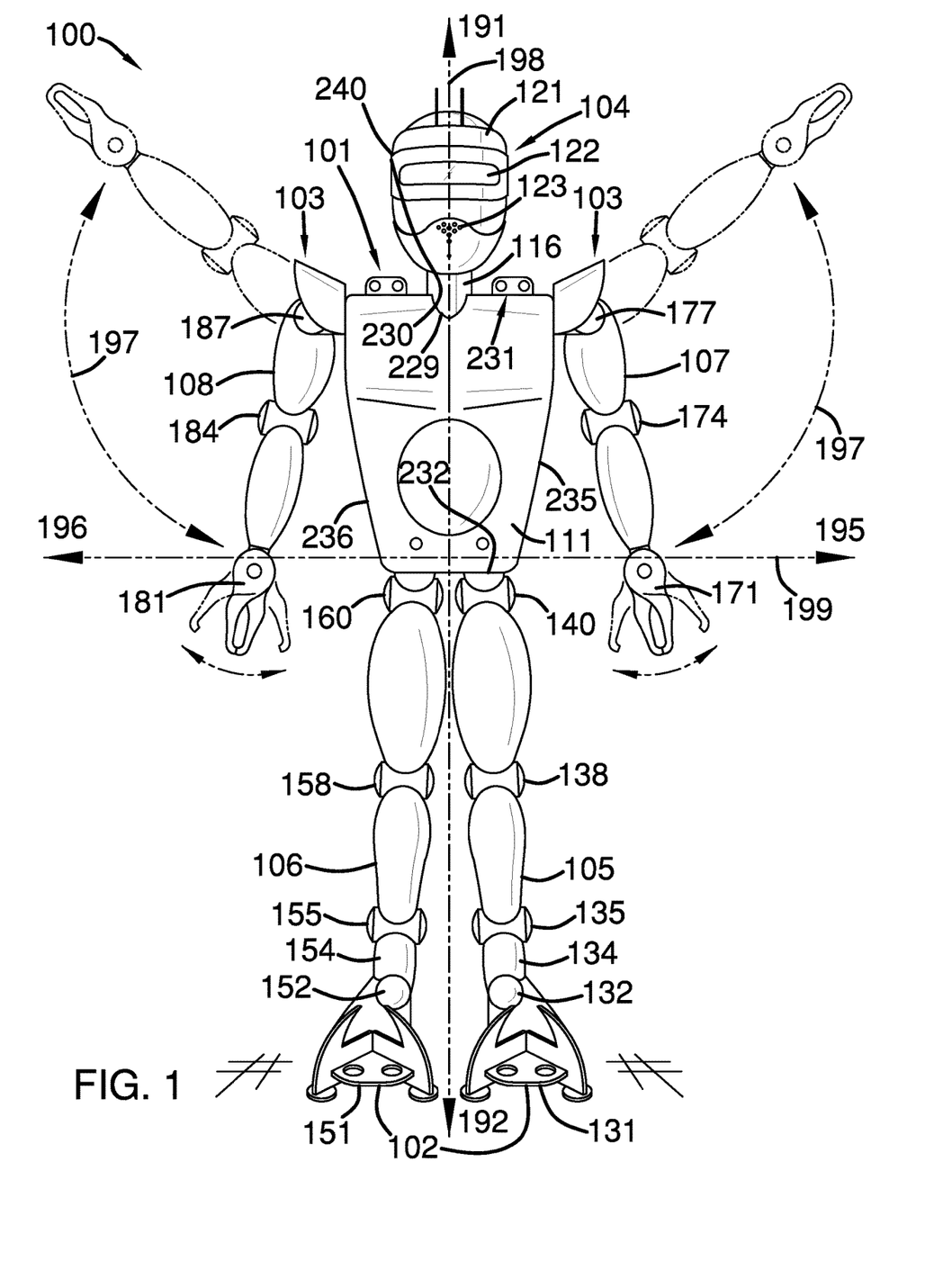
FIG. 1 is a front view of an embodiment of the disclosure.
Figure 2:
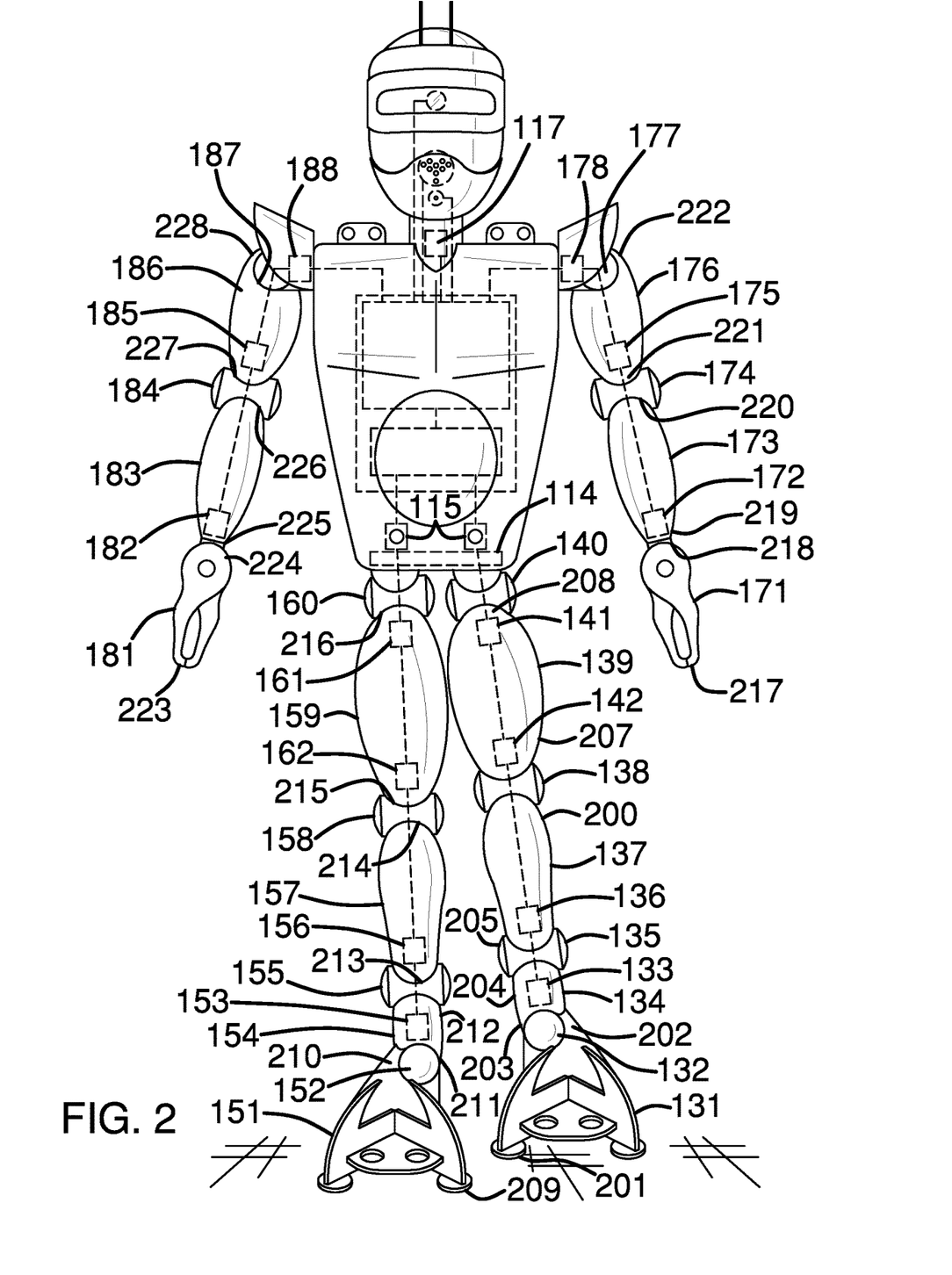
FIG. 2 is a front view of an embodiment of the disclosure.
Figure 3:
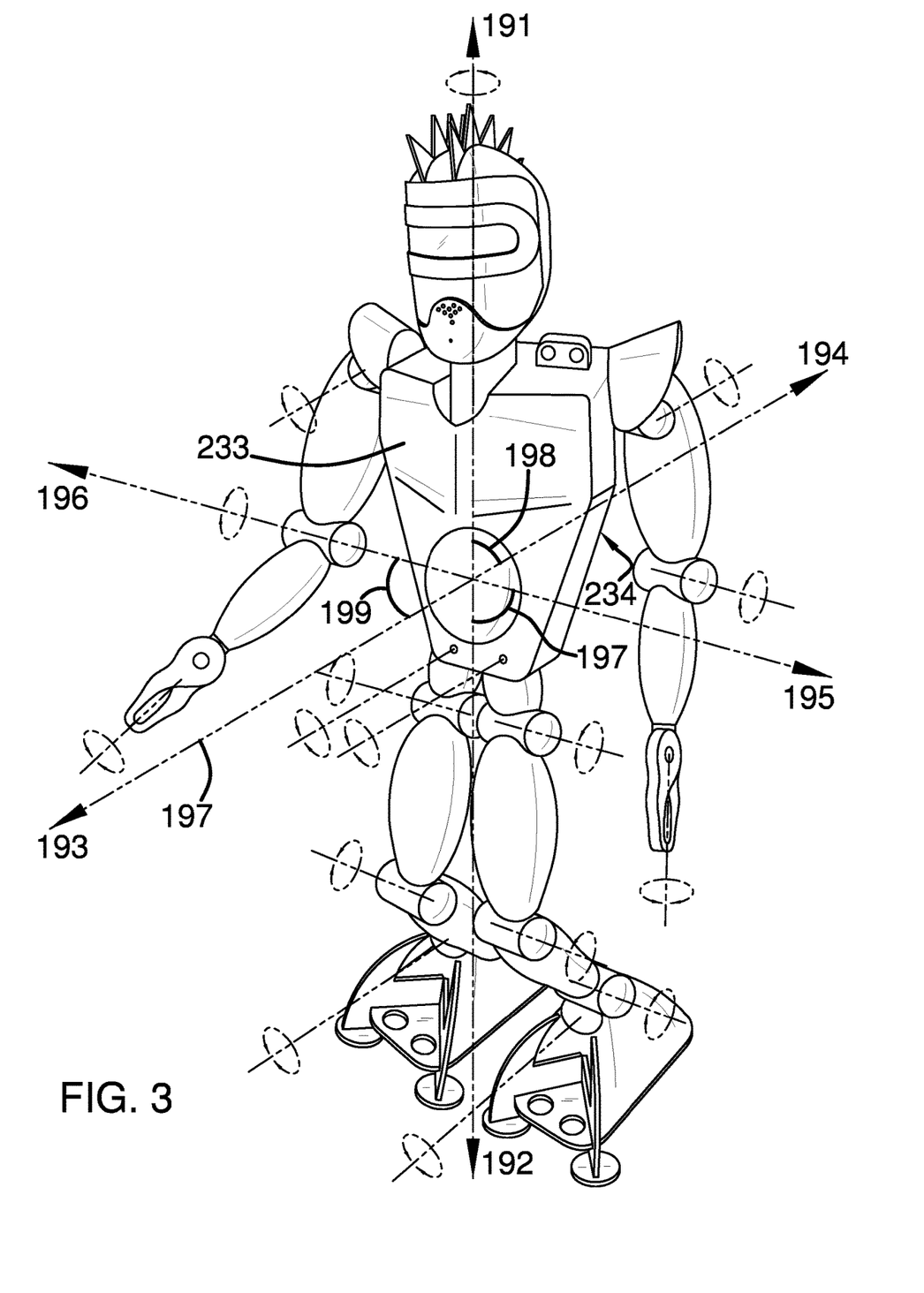
FIG. 3 is a perspective view of an embodiment of the disclosure.
Figure 4:
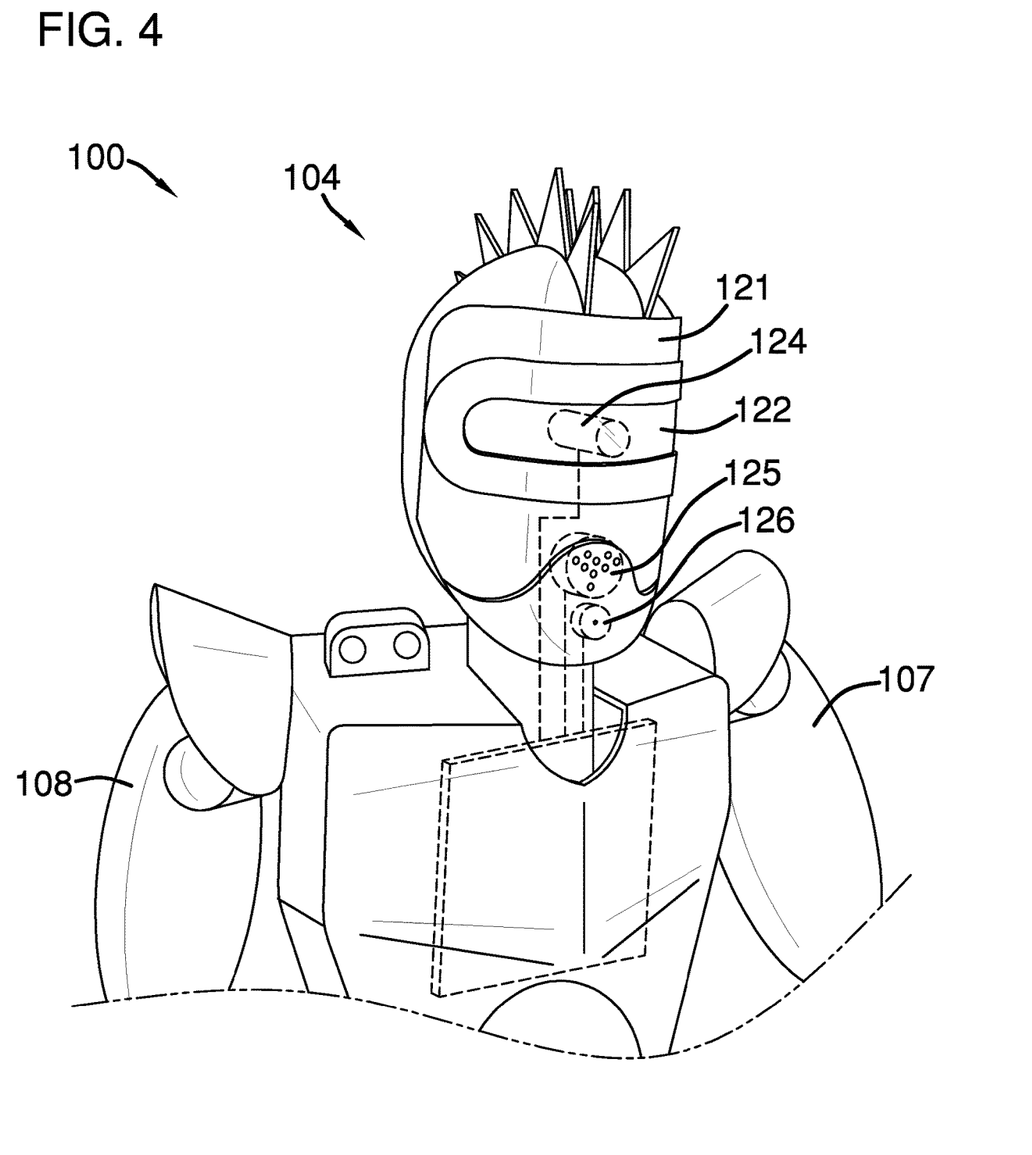
FIG. 4 is a detail view of an embodiment of the disclosure.
Figure 5:
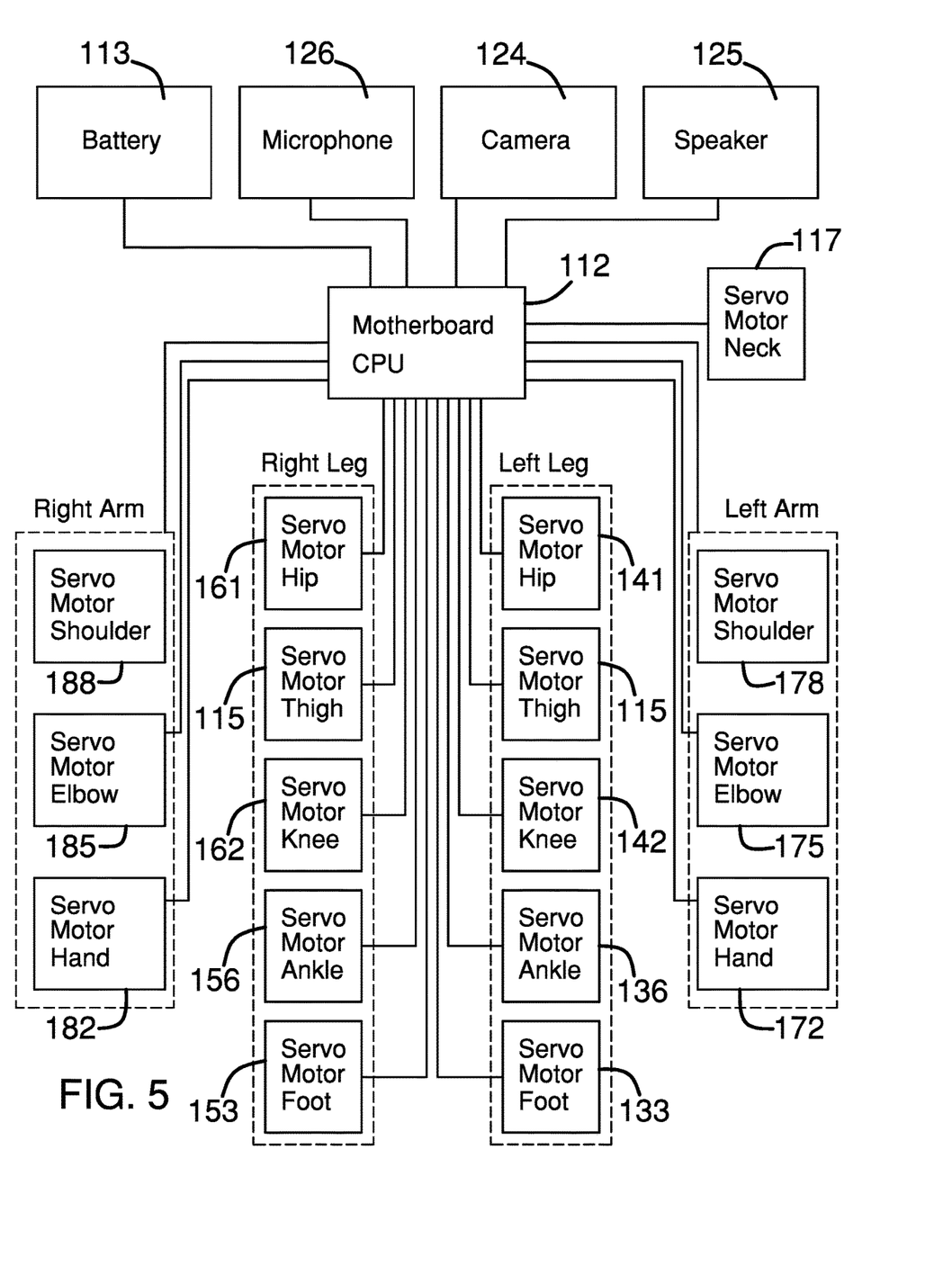
FIG. 5 is a block diagram or schematic view of an embodiment of the disclosure.

Detailed reference will now be made to one or more potential embodiments of the disclosure, which are illustrated in FIGS. 1 through 5.

The walking robot 100 (hereinafter invention) is a mobile robot. The invention 100 is configured to move in a bipedal manner. The bipedal movement of the invention 100 is autonomous. The invention 100 is a programmed device that: 1) can move in a bipedal fashion; 2) pick up and put down objects; 3) performs optical data processing functions such as avoiding objects during motion or identifying objects to pick up and put down; 4) performs speech recognition functions such as receiving spoken instruction; and, 5) responds to spoken instruction in an audible manner using a spoken language. The invention 100 comprises a torso 101, a plurality of legs 102, a plurality of arms 103, and a helmet 104. The plurality of legs 102, the plurality of arms 103, and the helmet 104 is attached to the torso 101. The invention 100 is controlled using a microcontroller 112 operated with the Linux operating system. Both the plurality of legs 102 and plurality of arms 103 both rotate in the coronal plane 197, sagittal plane 198 and the transverse plane 199.

The invention 100 is further defined with a superior direction 191, an inferior direction 192, an anterior direction 193, a posterior direction 194, a sinister direction 195, a dexter direction 196, a coronal plane 197, a sagittal plane 198, and a transverse plane 199. When discussing the coronal plane 197, the sagittal plane 198, and the transverse plane 199 in regards to the sinister arm 107 and the dexter arm 108 it is assumed that sinister arm 107 and the dexter arm 108 are positioned next to the torso 101 in a manner parallel to the line formed by the superior direction 191 and the inferior direction 192.

The superior direction 191 is described in greater detail elsewhere in this disclosure but is commonly thought of as the direction towards the head of a person. The inferior direction 192 is described in greater detail elsewhere in this disclosure but is commonly thought of as the direction towards the feet of a person. The anterior direction 193 is described in greater detail elsewhere in this disclosure but is commonly thought of as the direction towards the front side of a person. The posterior direction 194 is described in greater detail elsewhere in this disclosure but is commonly thought of as the direction towards the back side of a person. The sinister direction 195 is described in greater detail elsewhere in this disclosure but is commonly thought of as the direction towards the left side of a person. The dexter direction 196 is described in greater detail elsewhere in this disclosure but is commonly thought of as the direction towards the right side of a person.

The coronal plane 197 is a plane that roughly runs in the plane from the sinister direction 195 to the dexter direction 196 in a manner that is parallel to the medial axis. The sagittal plane 198 is a plane that roughly runs in the plane from the anterior direction 193 to the posterior direction 194 in a manner that is parallel to the medial axis. The transverse plane 199 is a plane that is roughly perpendicular to the medial axis. In this disclosure, the medial axis can be thought of as running in the direction from the inferior direction 192 to the superior direction 191.

Within this disclosure, bearings, extension structures are used extensively throughout this disclosure. These terms are used without introduction in the initial portions of this specification and are discussed in greater detail later within this specification. This is done for purposes of clarity of exposition within this specification and will be discussed in greater detail later within this specification The torso 101 is a rigid structure within which the microcontroller 112 and the battery 113 are contained. The sinister leg 105, the dexter leg 106, the sinister arm 107, the dexter arm 108, and the neck 116 are directly attached to the torso 101. The torso 101 comprises a torso housing 111, a microcontroller 112, a battery 113, a torso joint 114, a torso servo 115, a neck 116, and a neck servo 117. The neck 116 is further defined with a twenty ninth end 229 and a thirtieth end 230. The torso housing 111 is further defined with a superior 191 surface 231, an inferior 192 surface 232, an anterior 193 surface 233, a posterior 194 surface 234, a sinister 195 surface 235, and a dexter 196 surface 236.

The superior 191 surface 231 is the surface of the torso housing 111 that is proximal to the helmet housing 121. The inferior 192 surface 232 is the surface of the torso housing 111 that is proximal to the plurality of legs 102. The sinister 195 surface 235 is the surface of the torso housing 111 that is proximal to the sinister arm 107. The dexter 196 surface 236 is the surface of the torso housing 111 that is proximal to the dexter arm 108.

The torso housing 111 is the physical exterior structure of the torso 101.

The microcontroller 112 is a readily and commercially available electrical device commonly called a CPU motherboard. The microcontroller 112: 1) operates all servo motors contained within the invention 100; and, 2) monitors the camera 124 and processes the received video signals using optical data processing algorithms; 3) monitors the microphone 126 and processes the received audio signals using speech recognition algorithms; and, 4) generates interface outputs in an audible spoken language format.

The battery 113 is a readily and commercially available chemical device that converts chemical potential energy into electrical energy that is used to power the microcontroller 112 and the servo motors. In the first potential embodiment of the disclosure, the battery 113 is rechargeable.

The torso joint 114 is a readily and commercially available bearing. The torso servo 115 is a readily and commercially available servo motor. The neck 116 is an extension structure. The neck servo 117 is a readily and commercially available servo motor.

Each of the plurality of legs 102 forms a stanchion that creates a load path from the torso 101 to the supporting surface upon which the invention 100 walks. Each of the plurality of legs 102 comprises a collection of servo motors, bearings, and extension structures that allow the invention 100 to walk. The control of the servo motors within the plurality of legs 102 by the microcontroller 112 allows for the bipedal motion of the invention 100. The plurality of legs 102 comprises a sinister leg 105 and a dexter leg 106.

The sinister leg 105 is a leg selected from the plurality of legs 102 that is commonly called the left leg on a human. The sinister leg 105 comprises a sinister foot 131, a sinister foot joint 132, a sinister foot servo 133, a sinister ankle 134, a sinister ankle joint 135, a sinister ankle servo 136, a sinister lower leg 137, a sinister knee joint 138, a sinister thigh 139, a sinister hip joint 140, a sinister hip servo 141, and a sinister knee servo 142. The sinister foot 131 is further defined with a first end 201 and a second end 202. The sinister ankle 134 is further defined with a third end 203 and a fourth end 204. The sinister lower leg 137 is further defined with a fifth end 205 and a sixth end 206. The sinister thigh 139 is further defined with a seventh end 207 and an eighth end 208.

The sinister foot 131 is an extension structure that forms the inferior end of the sinister leg 105. The sinister foot joint 132 is a readily and commercially available bearing. The sinister foot servo 133 is a readily and commercially available servo motor. The sinister ankle 134 is an extension structure. The sinister ankle joint 135 is a readily and commercially available bearing. The sinister ankle servo 136 is a readily and commercially available servo motor. The sinister lower leg 137 is an extension structure. The sinister knee joint 138 is a readily and commercially available bearing. The sinister thigh 139 is an extension structure. The sinister hip joint 140 is a readily and commercially available bearing. The sinister hip servo 141 is a readily and commercially available servo motor. The sinister knee servo 142 is a readily and commercially available servo motor.

The dexter leg 106 is a leg selected from the plurality of legs 102 that is commonly called the right leg on a human. The dexter leg 106 comprises a dexter foot 151, a dexter foot joint 152, a dexter foot servo 153, a dexter ankle 154, a dexter ankle joint 155, a dexter ankle servo 156, a dexter lower leg 157, a dexter knee joint 158, a dexter thigh 159, a dexter hip joint 160, a dexter hip servo 161, and a dexter knee servo 162. The dexter foot 151 is further defined with a ninth end 209 and a tenth end 210. The dexter ankle 154 is further defined with an eleventh end 211 and a twelfth end 212. The dexter lower leg 157 is further defined with a thirteenth end 213 and a fourteenth end 214. The dexter thigh 159 is further defined with a fifteenth end 215 and a sixteenth end 216.

The dexter foot 151 is an extension structure that forms the inferior end of the dexter leg 106. The dexter foot joint 152 is a readily and commercially available bearing. The dexter foot servo 153 is a readily and commercially available servo motor. The dexter ankle 154 is an extension structure. The dexter ankle joint 155 is a readily and commercially available bearing. The dexter ankle servo 156 is a readily and commercially available servo motor. The dexter lower leg 157 is an extension structure. The dexter knee joint 158 is a readily and commercially available bearing. The dexter thigh 159 is an extension structure. The dexter hip joint 160 is a readily and commercially available bearing. The dexter hip servo 161 is a readily and commercially available servo motor. The dexter knee servo 162 is a readily and commercially available servo motor.

Each of the plurality of arms 103 is a movable structure that imitates the motion of an arm in a human. Each of the plurality of arms 103 comprises a collection of servo motors, bearings, and extension structures that allow the invention 100 to manipulate its environment. The plurality of arms 103 comprises a sinister arm 107 and a dexter arm 108.

The sinister arm 107 is an arm selected from the plurality of arms 103 that is commonly called the left arm on a human. The sinister arm 107 comprises a sinister hand 171, a sinister wrist servo 172, a sinister lower arm 173, a sinister elbow joint 174, a sinister elbow servo 175, a sinister upper arm 176, a sinister shoulder joint 177, and a sinister shoulder servo 178. The sinister hand 171 is further defined with a seventeenth end 217 and an eighteenth end 218. The sinister lower arm 173 is further defined with a nineteenth end 219 and a twentieth end 220. The sinister upper arm 176 is further defined with a twenty first end 221 and a twenty second end 222.

The sinister hand 171 is a two pronged claw that forms the distal end of the sinister arm 107. The microcontroller 112 is used to open and close the sinister hand 171 as required. The sinister wrist servo 172 is a readily and commercially available servo motor. The sinister lower arm 173 is an extension structure. The sinister elbow joint 174 is a readily and commercially available bearing. The sinister elbow servo 175 is a readily and commercially available servo motor. The sinister upper arm 176 is an extension structure. The sinister shoulder joint 177 is a readily and commercially available bearing. The sinister shoulder servo 178 is a readily and commercially available servo motor.

The dexter arm 108 is an arm selected from the plurality of arms 103 that is commonly called the right arm on a human. The dexter arm 108 comprises a dexter hand 181, a dexter wrist servo 182, a dexter lower arm 183, a dexter elbow joint 184, a dexter elbow servo 185, a dexter upper arm 186, a dexter shoulder joint 187, and a dexter shoulder servo 188. The dexter hand 181 is further defined with a twenty third end 223 and a twenty fourth end 224. The dexter lower arm 183 is further defined with a twenty fifth end 225 and a twenty sixth end 226. The dexter upper arm 186 is further defined with a twenty seventh end 227 and a twenty eighth end 228.

The dexter hand 181 is a two pronged claw that forms the distal end of the dexter arm 108. The microcontroller 112 is used to open and close the dexter hand 181 as required. The dexter wrist servo 182 is a readily and commercially available servo motor. The dexter lower arm 183 is an extension structure. The dexter elbow joint 184 is a readily and commercially available bearing. The dexter elbow servo 185 is a readily and commercially available servo motor. The dexter upper arm 186 is an extension structure. The dexter shoulder joint 187 is a readily and commercially available bearing. The dexter shoulder servo 188 is a readily and commercially available servo motor.

The helmet 104 is a housing that imitates the human head. The helmet 104 is used to house the sensors that are monitored by the microcontroller 112. The helmet 104 comprises a helmet housing 121, a camera viewport 122, an audio viewport 123, a camera 124, a speaker 125, and a microphone 126. The helmet housing 121 is further defined with an inferior connection 240. The inferior connection 240 is an accommodation formed within the torso housing 111 to which the thirtieth end 230 of the neck 116 may be attached.

The helmet housing 121 is the physical exterior structure of the helmet 104. The camera viewport 122 is an aperture formed within the helmet housing 121 for the purpose of providing a field of view for the camera 124. The audio viewport 123 is an aperture through which acoustic energy can pass. The speaker 125 and the microphone 126 respectively transmit and receive acoustic energy through the audio viewport 123. The camera 124 is a readily and commercially available image sensor. The speaker 125 is a readily and commercially available acoustic transducer. The microphone 126 is a readily and commercially available acoustic transducer.

The assembly of the invention 100 is described in the following 8 paragraphs.

The torso servo 115 attaches the torso joint 114 to the torso housing 111. The torso servo 115 rotates the torso joint 114 in the transverse plane 199.

The sinister hip joint 140 attaches to the torso joint 114. The sinister hip servo 141 attaches the eighth end 208 of the sinister thigh 139 to the sinister hip joint 140. The sinister hip servo 141 rotates the sinister hip joint 140 in the sagittal plane 198. The sinister knee servo 142 attaches the seventh end 207 of the sinister thigh 139 to the sinister knee joint 138. The sinister knee servo 142 rotates the sinister knee joint 138 in the sagittal plane 198. The sixth end 206 of the sinister lower leg 137 attaches to the sinister knee joint 138.

The sinister ankle servo 136 attaches the fifth end 205 of the sinister lower leg 137 to the sinister ankle joint 135. The sinister ankle servo 136 rotates the sinister ankle joint 135 in the sagittal plane 198. The fourth end 204 of the sinister ankle 134 attaches to the sinister ankle joint 135. The sinister foot servo 133 attaches the third end 203 of the sinister ankle 134 to the sinister foot joint 132. The sinister foot servo 133 rotates the sinister foot joint 132 in the coronal plane 197. The second end 202 of the sinister foot 131 attaches to the sinister foot joint 132. The first end 201 of the sinister foot 131 forms the final link of the load path to the supporting surface.

The dexter hip joint 160 attaches to the torso joint 114. The dexter hip servo 161 attaches the sixteenth end 216 of the dexter thigh 159 to the dexter hip joint 160. The dexter hip servo 161 rotates the dexter hip joint 160 in the sagittal plane 198. The dexter knee servo 162 attaches the fifteenth end 215 of the dexter thigh 159 to the dexter knee joint 158. The dexter knee servo 162 rotates the dexter knee joint 158 in the sagittal plane 198. The fourteenth end 214 of the dexter lower leg 157 attaches to the dexter knee joint 158.

The dexter ankle servo 156 attaches the thirteenth end 213 of the dexter lower leg 157 to the dexter ankle joint 155. The dexter ankle servo 156 rotates the dexter ankle joint 155 in the sagittal plane 198. The twelfth end 212 of the dexter ankle 154 attaches to the dexter ankle joint 155. The dexter foot servo 153 attaches the eleventh end 211 of the dexter ankle 154 to the dexter foot joint 152. The dexter foot servo 153 rotates the dexter foot joint 152 in the coronal plane 197. The tenth end 210 of the dexter foot 151 attaches to the dexter foot joint 152. The ninth end 209 of the dexter foot 151 forms the final link of the load path to the supporting surface.

The sinister shoulder servo 178 attaches the sinister shoulder joint 177 to the torso housing 111 on the sinister 195 surface 235 underneath the superior 191 surface 231. The sinister shoulder servo 178 rotates the sinister shoulder joint 177 in the coronal plane 197. The twenty second end 222 of the sinister upper arm 176 attaches to the sinister shoulder joint 177. The sinister elbow servo 175 attaches the twenty first end 221 of the sinister upper arm 176 to the sinister elbow joint 174. The sinister elbow servo 175 rotates the sinister elbow joint 174 in the sagittal plane 198. The twentieth end 220 of the sinister lower arm 173 attaches to the sinister elbow joint 174. The sinister wrist servo 172 attaches the nineteenth end 219 of the sinister lower arm 173 to the eighteenth end 218 of the sinister hand 171. The sinister wrist servo 172 rotates the sinister hand 171 in the transverse plane 199.

The dexter shoulder servo 188 attaches the dexter shoulder joint 187 to the torso housing 111 on the dexter 196 surface 236 underneath the superior 191 surface 231. The dexter shoulder servo 188 rotates the dexter shoulder joint 187 in the coronal plane 197. The twenty eighth end 228 of the dexter upper arm 186 attaches to the dexter shoulder joint 187. The dexter elbow servo 185 attaches the twenty seventh end 227 of the dexter upper arm 186 to the dexter elbow joint 184. The dexter elbow servo 185 rotates the dexter elbow joint 184 in the sagittal plane 198. The twenty sixth end 226 of the dexter lower arm 183 attaches to the dexter elbow joint 184. The dexter wrist servo 182 attaches the twenty fifth end 225 of the dexter lower arm 183 to the twenty fourth end 224 of the dexter hand 181. The dexter wrist servo 182 rotates the dexter hand 181 in the transverse plane 199.

The neck servo 117 attaches the twenty ninth end 229 of the neck 116 to the superior 191 surface 231 of the torso housing 111. The neck servo 117 rotates the neck 116 in the transverse plane 199. The thirtieth end 230 of the neck 116 attaches to the inferior connection 240 of the helmet housing 121 such that the rotation of the neck 116 will rotate the helmet housing 121 of the helmet 104.

The following definitions were used in this disclosure:

Anterior: As used in this disclosure, anterior is a term that is used to refer to the front side or direction of an object. When comparing two objects, the anterior object is the object that is closer to front of the object. See Coronal Transverse, Sagittal, Dexter, and Sinister.

Autonomous: As used in this disclosure, autonomous refers to a device that is capable of independent operation. By independent operation is meant that the primary function of the device is self-contained and does not require external control or guidance to perform the primary function. Within this disclosure, it is explicitly assumed that incidental control functions, such as initiating the operation of the primary function or maintenance functions, may reside outside of the device.

Battery: As used in this disclosure, a battery is a container consisting of one or more cells, in which chemical energy is converted into electricity and used as a source of power.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Camera: As used in this disclosure, a camera is a sensor that converts light into electric signals that encode and records the spatial orientation of the captured light in a manner that reproduces the images seen by a human eye.

Coronal Plane: As used in this disclosure, the coronal plane refers to a reference plane that bisects an anterior surface and posterior surface.

Decorative: As used in this disclosure, the term decorative is used to describe a design decision or feature that is made for aesthetic purposes and is not anticipated to materially affect the novelty of the innovation described in this disclosure.

Dexter: As used in this disclosure, dexter is a directional reference that refers to the right side of the body or the right side of an object from the perspective of a viewer who is facing the posterior side of the object.

Distal: As used in this disclosure, the term distal is used to describe the relative location of two objects. The distal object is: 1) the object that is further from a previously specified center axis when the direction of comparison is the radial direction; and 2) the object that is further from a center point on a center axis when the direction of comparison is in the lateral direction.

Electric Motor: In this disclosure, an electric motor is a machine that converts electric energy into rotational mechanical energy.

Extension Structure: As used in this disclosure, an extension structure is an inert physical structure that is used to extend the span of the distance between any two objects.

Feedback: As used in this disclosure, feedback refers to an engineered system or subsystem further comprising an "input" and an "output" wherein the difference between the output of the engineered system or subsystem and a reference is used as, or fed back into, a portion of the input of the engineered system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Field of View: As used in this disclosure, a field of view refers to one or more angles which delimits an area from which electromagnetic radiation will be sensed by an image sensor.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image Sensor: As used in this disclosure, an image sensor receives light from the exterior of the image sensor and converts the received light into a digital representation of sufficient detail to allow a microcontroller to create and display a visual reproduction of the source of the captured light.

Inferior: As used in this disclosure, the term inferior refers to a directional reference that is parallel to and in the same direction as the force of gravity.

Lateral: As used in this disclosure, lateral refers to a directional sense or location of the body. Specifically, lateral refers to an object or a side of an object that is proximal to the side or distal from the medial axis of the body.

Load Path: As used in this disclosure, a load path refers to a chain of one or more structures that transfers a load generated by a raised structure or object to a foundation or the earth.

Medial Axis: As used in this disclosure, the medial axis is the center line of the body as the line is drawn from the head to the foot. When two objects are compared relative to the medial axis, the object closer to the medial axis is referred to as the medial object and the object distal from the medial axis is referred to as the lateral object.

Medial: As used in this disclosure, medial refers to a directional sense or location of the body. Specifically, medial refers to an object or a side of an object that is proximal to the medial axis or distal from of the side body.

Microcontroller: As used in this disclosure, a microcontroller is a small computer, often on a single integrated circuit, containing a processor core, memory, and programmable input/output peripherals.

Microphone: As used in this disclosure, a microphone is a transducer that converts the energy from vibration into electrical energy. The sources of vibrations include, but are not limited to, acoustic energy.

Motor: As used in this disclosure, a motor refers to the method of transferring energy from an external power source into mechanical energy.

Optical Data Processor: As used in this disclosure, an optical data processor refers to a collection of commercially available algorithms that process a digital representation of an image in a manner that allows an electronically operated device, such as a computer, to extract data from the digital representation of the image and take a subsequent action based on the data extracted from the image.

Posterior: As used in this disclosure, posterior is a term that is used to refer to the side of an object that is distal or in the opposite direction of the anterior side. When comparing two items, the posterior item is the item that is distal from the front of the object.

Puppet: As used in this disclosure, a puppet is a figure resembling a human, animal or symbolic image that can be moved and that is used for industrial, entertainment or educational purposes.

Robot: As used in this disclosure, a robot is a programmable electronic device that automatically performs a series of predetermined actions.

Sagittal Plane: As used in this disclosure, the sagittal plane refers to a plane that is perpendicular to the both the coronal plane and the transverse plane.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Servo Motor: As used in this disclosure, a servo motor is an electrical motor that further incorporates a feedback circuit that allows for the precise angular positioning of the electric motor.

Sinister: As used in this disclosure, sinister is a directional reference that refers to the left side of the body or the left side of an object from the perspective of a viewer who is facing the posterior side of the object.

Speaker: As used in this disclosure, a speaker is an electrical device that converts an electrical signal into an audible sound.

Speech Recognition: As used in this disclosure, an speech recognition refers to a collection of commercially available algorithms that capture process a digital representation of an audible sound in a manner that allows an electronically operated device, such as a computer, to extract data from the digital representation of an audible sound and take a subsequent action based on the data extracted from the audible sound.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Transducer: As used in this disclosure, a transducer is a device that converts a physical quantity, such as pressure or brightness into an electrical signal or a device that converts an electrical signal into a physical quantity.

Transverse Plane: As used in this disclosure, a transverse plane is a plane that divides an object into a superior section and an inferior section. In a person the transverse plane would be perpendicular to the medial axis of the body.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A walking robot comprising:
   a torso, a plurality of legs, a plurality of arms, and a helmet;
   wherein the plurality of legs, the plurality of arms, and the helmet is attached to the torso;
   wherein the walking robot is a programmed device;
   the walking robot is a mobile device;
   wherein the bipedal movement of the walking robot is autonomous;
   wherein the walking robot is configured to move in a bipedal manner;
   wherein both the plurality of legs and plurality of arms both rotate in the coronal plane, sagittal plane and the transverse plane;
   wherein the walking robot is further defined with a superior direction, an inferior direction, an anterior direction, a posterior direction, a sinister direction, a dexter direction, a coronal plane, a sagittal plane, and a transverse plane;
   wherein the walking robot is configured to pick up and put down objects;
   wherein the walking robot is configured to perform optical data processing functions;
   wherein the walking robot is configured to perform speech recognition functions such as receiving spoken instruction;
   wherein the walking robot is configured to respond to spoken instruction in an audible manner using a spoken language;

wherein the walking robot is controlled using a microcontroller operated with a Linux operating system;

wherein the torso comprises a torso housing, a microcontroller, a battery, a torso joint, a torso servo, a neck, and a neck servo;

wherein the torso servo, the neck, and the neck servo attach to the torso housing;

wherein the torso housing is further defined with a superior surface, an inferior surface, an anterior surface, a posterior surface, a sinister surface, and a dexter surface;

wherein the neck is further defined with a twenty ninth end and a thirtieth end;

wherein the microcontroller is a CPU motherboard;

wherein the battery is a chemical device that converts chemical potential energy into electrical energy;

wherein the torso joint is a bearing;

wherein the torso servo is a servo motor;

wherein the neck is an extension structure;

wherein the neck servo is a servo motor;

wherein each of the plurality of legs forms a stanchion that creates a load path from the torso to a supporting surface;

wherein each of the plurality of legs comprises a first plurality of servo motors, the bearings, and extension structures that allow the walking robot to walk;

wherein the servo motors within the plurality of legs are controlled by the microcontroller;

wherein the plurality of legs comprises a sinister leg and a dexter leg.

2. The walking robot according to claim 1 wherein the sinister leg comprises a sinister foot, a sinister foot joint, a sinister foot servo, a sinister ankle, a sinister ankle joint, a sinister ankle servo, a sinister lower leg, a sinister knee joint, a sinister thigh, a sinister hip joint, a sinister hip servo, and a sinister knee servo;

wherein the sinister foot is further defined with a first end and a second end;

wherein the sinister ankle is further defined with a third end and a fourth end;

wherein the sinister lower leg is further defined with a fifth end and a sixth end;

wherein the sinister thigh is further defined with a seventh end and an eighth end;

wherein the sinister foot is an extension structure that forms the inferior end of the sinister leg;

wherein the sinister foot joint is a bearing;

wherein the sinister foot servo is a servo motor;

wherein the sinister ankle is an extension structure;

wherein the sinister ankle joint is a bearing;

wherein the sinister ankle servo is a servo motor;

wherein the sinister lower leg is an extension structure;

wherein the sinister knee joint is a bearing;

wherein the sinister thigh is an extension structure;

wherein the sinister hip joint is a bearing;

wherein the sinister hip servo is a servo motor;

wherein the sinister knee servo is a servo motor.

3. The walking robot according to claim 2 wherein the dexter leg comprises a dexter foot, a dexter foot joint, a dexter foot servo, a dexter ankle, a dexter ankle joint, a dexter ankle servo, a dexter lower leg, a dexter knee joint, a dexter thigh, a dexter hip joint, a dexter hip servo, and a dexter knee servo;

wherein the dexter foot is further defined with a ninth end and a tenth end;

wherein the dexter ankle is further defined with an eleventh end and a twelfth end;

wherein the dexter lower leg is further defined with a thirteenth end and a fourteenth end;

wherein the dexter thigh is further defined with a fifteenth end and a sixteenth end;

wherein the dexter foot is an extension structure that forms the inferior end of the dexter leg;

wherein the dexter foot joint is a bearing;

wherein the dexter foot servo is a servo motor;

wherein the dexter ankle is an extension structure;

wherein the dexter ankle joint is a bearing;

wherein the dexter ankle servo is a servo motor;

wherein the dexter lower leg is an extension structure;

wherein the dexter knee joint is a bearing;

wherein the dexter thigh is an extension structure;

wherein the dexter hip joint is a bearing;

wherein the dexter hip servo is a servo motor;

wherein the dexter knee servo is a servo motor.

4. The walking robot according to claim 3 wherein each of the plurality of arms is a movable structure wherein each of the plurality of arms comprises a second plurality of servo motors;

wherein the servo motors within the plurality of arms are controlled by the microcontroller;

wherein the plurality of arms comprises a sinister arm and a dexter arm.

5. The walking robot according to claim 4 wherein the sinister arm comprises a sinister hand, a sinister wrist servo, a sinister lower arm, a sinister elbow joint, a sinister elbow servo, a sinister upper arm, a sinister shoulder joint, and a sinister shoulder servo;

wherein the sinister hand is further defined with a seventeenth end and an eighteenth end;

wherein the sinister lower arm is further defined with a nineteenth end and a twentieth end;

wherein the sinister upper arm is further defined with a twenty first end and a twenty second end;

wherein the sinister hand is a two pronged claw that forms a distal end of the sinister arm;

wherein the microcontroller operates the sinister hand;

wherein the sinister wrist servo is a servo motor;

wherein the sinister lower arm is an extension structure;

wherein the sinister elbow joint is a bearing;

wherein the sinister elbow servo is a servo motor;

wherein the sinister upper arm is an extension structure;

wherein the sinister shoulder joint is a bearing;

wherein the sinister shoulder servo is a servo motor.

6. The walking robot according to claim 5 wherein the dexter arm comprises a dexter hand, a dexter wrist servo, a dexter lower arm, a dexter elbow joint, a dexter elbow servo, a dexter upper arm, a dexter shoulder joint, and a dexter shoulder servo;

wherein the dexter hand is further defined with a twenty third end and a twenty fourth end;

wherein the dexter lower arm is further defined with a twenty fifth end and a twenty sixth end;

wherein the dexter upper arm is further defined with a twenty seventh end and a twenty eighth end;

wherein the dexter hand is a two pronged claw that forms a distal end of the dexter arm;

wherein the microcontroller opens and closes the dexter hand;

wherein the dexter wrist servo is a servo motor;

wherein the dexter lower arm is an extension structure;

wherein the dexter elbow joint is a bearing;

wherein the dexter elbow servo is a servo motor;
wherein the dexter upper arm is an extension structure;
wherein the dexter shoulder joint is a bearing;
wherein the dexter shoulder servo is a servo motor.

7. The walking robot according to claim 6
wherein the helmet comprises a helmet housing, a camera viewport, an audio viewport, a camera, a speaker, and a microphone;
wherein the helmet housing contains the camera viewport, the audio viewport, the camera, the speaker, and the microphone;
wherein the helmet housing is further defined with an inferior connection;
wherein the neck attaches to the inferior connection.

8. The walking robot according to claim 7
wherein the camera viewport is an aperture formed within the helmet housing;
wherein the camera viewport provides a field of view for the camera;
wherein the audio viewport is an aperture through which acoustic energy can pass.

9. The walking robot according to claim 8
wherein the camera is an image sensor;
wherein the speaker is a first acoustic transducer;
wherein the microphone is a second acoustic transducer.

10. The walking robot according to claim 9
wherein the torso servo attaches the torso joint to the torso housing;
wherein the torso servo rotates the torso joint in the transverse plane.

11. The walking robot according to claim 10
wherein the sinister hip joint attaches to the torso joint;
wherein the sinister hip servo attaches the eighth end of the sinister thigh to the sinister hip joint;
wherein the sinister hip servo rotates the sinister hip joint in the sagittal plane;
wherein the sinister knee servo attaches the seventh end of the sinister thigh to the sinister knee joint;
wherein the sinister knee servo rotates the sinister knee joint in the sagittal plane;
wherein the sixth end of the sinister lower leg attaches to the sinister knee joint;
wherein the sinister ankle servo attaches the fifth end of the sinister lower leg to the sinister ankle joint;
wherein the sinister ankle servo rotates the sinister ankle joint in the sagittal plane;
wherein the fourth end of the sinister ankle attaches to the sinister ankle joint;
wherein the sinister foot servo attaches the third end of the sinister ankle to the sinister foot joint;
wherein the sinister foot servo rotates the sinister foot joint in the coronal plane;
wherein the second end of the sinister foot attaches to the sinister foot joint.

12. The walking robot according to claim 11
wherein the dexter hip joint attaches to the torso joint;
wherein the dexter hip servo attaches the sixteenth end of the dexter thigh to the dexter hip joint;
wherein the dexter hip servo rotates the dexter hip joint in the sagittal plane;
wherein the dexter knee servo attaches the fifteenth end of the dexter thigh to the dexter knee joint;
wherein the dexter knee servo rotates the dexter knee joint in the sagittal plane;
wherein the fourteenth end of the dexter lower leg attaches to the dexter knee joint;
wherein the dexter ankle servo attaches the thirteenth end of the dexter lower leg to the dexter ankle joint;
wherein the dexter ankle servo rotates the dexter ankle joint in the sagittal plane;
wherein the twelfth end of the dexter ankle attaches to the dexter ankle joint;
wherein the dexter foot servo attaches the eleventh end of the dexter ankle to the dexter foot joint;
wherein the dexter foot servo rotates the dexter foot joint in the coronal plane;
wherein the tenth end of the dexter foot attaches to the dexter foot joint.

13. The walking robot according to claim 12
wherein the sinister shoulder servo attaches the sinister shoulder joint to the torso housing on the sinister surface underneath the superior surface;
wherein the sinister shoulder servo rotates the sinister shoulder joint in the coronal plane;
wherein the twenty second end of the sinister upper arm attaches to the sinister shoulder joint;
wherein the sinister elbow servo attaches the twenty first end of the sinister upper arm to the sinister elbow joint;
wherein the sinister elbow servo rotates the sinister elbow joint in the sagittal plane;
wherein the twentieth end of the sinister lower arm attaches to the sinister elbow joint;
wherein the sinister wrist servo attaches the nineteenth end of the sinister lower arm to the eighteenth end of the sinister hand;
wherein the sinister wrist servo rotates the sinister hand in the transverse plane.

14. The walking robot according to claim 13
wherein the dexter shoulder servo attaches the dexter shoulder joint to the torso housing on the dexter surface underneath the superior surface;
wherein the dexter shoulder servo rotates the dexter shoulder joint in the coronal plane;
wherein the twenty eighth end of the dexter upper arm attaches to the dexter shoulder joint;
wherein the dexter elbow servo attaches the twenty seventh end of the dexter upper arm to the dexter elbow joint;
wherein the dexter elbow servo rotates the dexter elbow joint in the sagittal plane;
wherein the twenty sixth end of the dexter lower arm attaches to the dexter elbow joint;
wherein the dexter wrist servo attaches the twenty fifth end of the dexter lower arm to the twenty fourth end of the dexter hand;
wherein the dexter wrist servo rotates the dexter hand in the transverse plane.

15. The walking robot according to claim 14
wherein the neck servo attaches the twenty ninth end of the neck to the superior surface of the torso housing;
wherein the neck servo rotates the neck in the transverse plane;
wherein the thirtieth end of the neck attaches to the inferior connection of the helmet housing such that the rotation of the neck will rotate the helmet housing of the helmet.

* * * * *